United States Patent [19]

Osterlund

[11] Patent Number: 5,321,441
[45] Date of Patent: Jun. 14, 1994

[54] SUNGLASS LENSES HAVING UV BLOCKING CENTRAL ZONE

[75] Inventor: Jan E. Osterlund, Sunningdale, England

[73] Assignee: Tanoptic AG, Basel, Switzerland

[21] Appl. No.: 67,788

[22] PCT Filed: Sep. 15, 1986

[86] PCT No.: PCT/GB86/00544
 § 371 Date: Jul. 10, 1990
 § 102(e) Date: Jul. 10, 1990

[87] PCT Pub. No.: WO87/01821
 PCT Pub. Date: Mar. 26, 1987

[30] Foreign Application Priority Data

Sep. 13, 1985 [GB] United Kingdom ............... 8522697
Sep. 30, 1985 [GB] United Kingdom ............... 8524034

[51] Int. Cl.$^5$ ............................................. G02C 7/10
[52] U.S. Cl. ......................................... 351/44; 351/45
[58] Field of Search ................ 351/44, 45, 165, 163; 350/438; 359/355, 361

[56] References Cited

U.S. PATENT DOCUMENTS 2,043,840  6/1936  Singer .................................. 351/165
2,286,219  6/1942  Martinek ............................... 351/44
3,382,183  5/1968  Donoian ............................... 351/163

FOREIGN PATENT DOCUMENTS 1092544   4/1955  France .
1105195  11/1955  France .
1383104  11/1964  France .................................. 351/45
8011991   5/1980  France .

Primary Examiner—Bruce Y. Arnold
Assistant Examiner—Hung Xuan Dang
Attorney, Agent, or Firm—Bacon & Thomas

[57] ABSTRACT

The present invention provides a sunglass lens having a central region which is provided with an ultra-violet screening agent to protect the eye while the surrounding regions of the lens have little or no screening agent so as to permit tanning of the skin around the eye. In a preferred embodiment, the lens is additionally colored with tint, the darkness of which may vary over the surface area of the lens. In addition, the variation of tint over the surface of the lens is different from the variation of the ultra-violet screening agent. For example, the ultra-violet screening agent is most highly concentrated in the central portion of the lens whereas the colored tint is most highly concentrated around the periphery of the lens.

15 Claims, 2 Drawing Sheets

SUNGLASS LENSES HAVING UV BLOCKING CENTRAL ZONE

The invention relates primarily to sunglass lenses and in particular to such lenses which provide adequate screening from possibly damaging ultra-violet radiation without leaving the customary markings around the eyes which are normally associated with the wearing of sunglasses. However, it will be appreciated that the invention, in its broadest aspects, has other applications. Furthermore, there are many features disclosed in this specification which are themselves inventive both in relation to sunglass lenses and their production, and to other contexts.

As regards the primary aspect of this disclosure, it is known to provide sung. lass lenses with an ultra-violet blocker, such as a coating of benzophenone, to protect the eyes of a wearer from the possible harmful effects of ultra-violet radiation. However, such a blocker not only restricts the impingement of ultra-violet radiation on the sensitive parts of the eye but also restricts its impingement on other parts of the body shielded by the lens. In particular, the skin surrounding the eve will be shielded, since sunglass lenses are normally significantly larger than the body of the eye. As a result of this, the skin adjacent to the eye will be subject to less ultra-violet radiation than the remainder of the face. When the sunglasses are removed, and in some cases even when they are worn, there will be apparent an area of paler skin around the eye compared to regions of the face which are tanned. This is unsightly.

It has now been found that it is possible to obtain a satisfactory screening effect to protect the eye, by providing the ultra-violet blocker only in a central region of the lens, for example corresponding to the pupil of the eye. Of course, it might still be desired to provide blocker in the region radially outwards of this central region but to a lesser concentration, so as to provide some peripheral protection while still permitting a sufficient degree of tanning of the skin around the eye. Thus, viewed from one aspect there is disclosed herein a lens to protect the eye from harmful radiation which is provided with a light transmitting ultra-violet blocking agent, characterised in that the concentration of the blocking agent in a central region of the lens is greater than that in a peripheral region surrounding the central region.

Outside of the central region, there may be little or no blocking agent or alternatively blocking agent to a lower concentration insufficient to give full protection to the eye or to prevent adequate tanning of the skin. In the latter case, the concentration may increase in the radially inwardly direction, towards the central region. Within the central region the concentration may also vary, e.g. to be greatest at the centre. The boundary between the central region and the peripheral region may be abrupt, with a sudden change in concentration, or may be gradual. In the latter case there could be a generally constant gradient with the concentration increasing from the periphery to the centre, so that there would be no clearly defined boundary in terms of a change in concentration. In such a case, it may be necessary to consider the boundary as being a line at which the amount of blocker passes above a threshold value or there is a threshold value of effectiveness. The size of the central region may vary from e.g. 5 mm across to even 30 to 40 mm across, with an average for practical purposes being 10 or 15 mm. The larger size will provide protection for sensitive eye lids.

The shape of the central region can be circular, elliptical, polygonal, or of any other shape which will produce the desired effect of protecting the eye whilst permitting tanning in the surrounding area. It could be in the form of a narrow strip across the lens. The region does not necessarily have to correspond to the geometrical or optical centre of the lens.

Frequently, the blocker will be substantially colourless, and there may be provided other materials so as to tint the lens evenly or with a gradient e.g. from top to bottom, provide polarisation, variable light sensitive tinting and so forth. The lenses may be optically correcting if desired, but it should be appreciated that the word lens is intended to cover any screen for the eye.

For the purposes of the broad aspect specifically outlined above, a distinction is drawn between an ultra-violet blocker having a substantial ultra-violet blocking ability and a conventional tinting agent or the like which mainly restricts the visible wavelengths. A suitable ultra-violet screening agent should be stable, an effective absorber and for general applicability, preferably colourless to prevent interference with tints. It is particularly desirable to have a sharp drop in absorption coefficient at the edge of the visible colouration. These requirements are well met in many applications by O-hydroxyphenylketones, O-hydroxybenzophenones being particularly useful. 2-(2-hydroxyphenyl)benzotriazoles also possess good screening agent properties. Particular agents could be 2,2'-dihydroxy-4,4'-dimethoxy-benzophenone (Uvinol) or 2-(2-hydroxy-4-methyl-phenyl)-benzo[d]triazole (Tinuvin P).

Generally speaking, the blocker will be applied to the lens by coating with a solution of the blocker dye, for example by spraying, dipping or the like.

The central region, in the coating porocess, can be defined by an aperture in a screen which is placed over the lens, such as an adhesive or adherent tape, film or the like. This will produce a well defined central region. If the coating solution is allowed to soak into the lens, there may be a less well defined boundary which can be desirable in some cases.

Particularly in the case of dipping, it may be necessary to have the screen on both sides of the lens. Only one screen may be apertured, or both. In the case of both being apertured, the aligned apertures may be of the same or differing sizes. In the latter case this can result in a more gradual transition around the boundary, with varying concentration of the blocker depending e.g. on the length of time, the thickness of the lens and so forth.

An even more gradual transition could be provided by a new dipping technique in which the lens is coated evenly with the blocker and then treated with a solvent in such a way that the amount of blocker removed decreases in a radially inwards direction. This can be achieved by rotating the lens, dipping it into the solvent, and then removing it gradually so that the outer regions are subjected to the solvent for a greater period than the central region. Suitable adjustment can be made to the initial depth of immersion, the speed of rotation, the speed of withdrawal and so forth.

The lenses will generally be used as pairs in a frame to form sunglasses. However the lenses could be used in ordinary spectacles, ski goggles, face masks, driving goggles and shields, and so forth.

The invention for which protection is sought extends not only to the lenses and their use in sunglasses and the like but also to their manufacture by any of the processes outlined above.

It will be apparent that a number of the concepts described above will be of relevance to other fields of more general applicability, and protection may be sought for these aspects also.

Thus particular attention may be paid to coating methods for the surface treatment of objects, and particularly lenses.

As mentioned above, it is well known that sunglass lenses can be colour tinted, whether or not they rely upon polarisation or other factors. It is also well known for optically correcting spectacle lenses to be colour tinted. In many cases the colour tinting serves a purpose e.g. to reduce glare, but it is becoming increasingly popular for tinting to be employed purely for cosmetic purposes. Indeed, there are tinted spectacles available which have no optical function at all.

It is known to have a graded density on a tinted lens. Thus, for example, a lens may be darker at the top than at the bottom, so as to reduce glare from the sun which is predominantly above the wearer. For use by skiers on snow, there are known lenses which are dark at both the top and the bottom so as to reduce glare from both sun and snow, but are brighter in the middle region to improve straight ahead vision. Generally speaking, it is desirable to have a gradual change from a dark region to a bright region.

A currently popular way of tinting lenses is to dip them into a dye and then withdraw them. The lowermost portions remain in the dye the longest and become the darkest. The other portions are gradually lighter in colour as they spend less time in the dye. The process can be repeated as required, and to provide the lenses with dark tops and bottoms the lens can be repositioned before being dipped again in the dye.

Such a process is limited in terms of the colouring effects which can be obtained but has the advantage of simplicity which permits it to be carried out by opticians according to a customer's wishes.

It is now proposed to provide a new type of coated lens with a change in coating properties from all directions towards the centre of the lens. Such a lens is novel, and could be for example dark around its entire periphery and light at the centre, or even dark at the centre and light around its periphery. The coating could serve specific optical purposes, for example to block ultraviolet rays as mentioned earlier but can only be to provide shading to exclude glare and/or to produce a cosmetic effect. The shading can be even at any given radial distance from the centre of the lens, and can vary gradually with a change in such radial distance.

This type of lens may have an advantageous optical effect, particularly where the periphery is dark. The wearer will be shielded from unwanted glare from all directions but will still have good straight ahead vision. The combination of this with a central region having ultra-violet blocking properties may be particularly useful.

Lenses of this type have not been possible with many processes carried out previously and there is thus disclosed a new process for treating the surface of an object, such as a lens, in which the object is subjected to reversible relative movement generally perpendicular to the surface of a treating fluid so that increasing and then decreasing areas of the object are in contact with the fluid at any given moment and in which during at least part of the course of such movement the object is rotated about an axis extending laterally of the direction of movement and passing through the object.

Thus, providing the axis of rotation is clear of the fluid there will be portions of the surface which are not contacted with the fluid and will be subject to reduced treatment. However, rotation of the object will ensure equal treatment of all regions of the object which are spaced from the axis of rotation by an amount equal to or greater than the distance of the axis from the surface of the fluid. If this distance is gradually increased then gradually less and less of the object will contact the fluid. The result of such treatment will be that from all radial directions there will be a gradual reduction towards the axis of rotation, in terms of the amount of treatment to which the surface is subjected.

Where the treating fluid is a dye, and the length of treatment alters the shading, the effect will be to have a darker periphery. In such a case the object is preferably a lens and the axis of rotation will pass through the centre of the lens. If the process is such that the centre of the lens never contacts the fluid, then this area will be completely clear. In general the object such as a lens, only has to be in initial contact with fluid for half its depth for the process to be effective, any more being superfluous and any less leading to the clear central region.

In some cases it might be desirable to have a lighter periphery and a darker centre e.g. to protect the eye. This could be achieved by first dyeing the object evenly by any suitable means, and then treating it as set forth above with e.g. a solvent which will remove the dye. The periphery will be treated for longer and will thus be lighter.

As indicated earlier, a similar arrangement could be of particular importance for lenses if the initial coating is of an ultra-violet blocker, whether or not in the form of a coloured dye. By first carrying out generally even coating and then treating as above, the centre of the lens will have a greater blocking effect on ultra-violet light than the periphery. This will protect the most sensitive part of the eye from the possible harmful effects of ultra-violet radiation. On the other hand, good peripheral vision is maintained. Such a concept may be of use for a variety of treating fluids, whether or not a colouring effect is achieved, and a variety of objects.

The rotation should be gradual and continuous although intermittent rotation might be used, for example to provide darker shading at the top of a lens whilst still retaining the overall effect. Similarly the relative motion should be gradual and continuous although again intermittent motion might be used.

The relative movement could be effected by moving the object itself, or by keeping the object stationary and varying the level of fluid, either by moving a reservoir of the fluid or by pumping it into and out of a reservoir. The movement could be automatically or manually effected or controlled. Similarly, rotation could be automatically or manually effected or controlled and typically will involve the use of an electric motor.

A particularly preferred form of apparatus disclosed includes, in broad terms, a carrier adapted to hold the object with the surface to be treated extending generally vertically, means for rotating the carrier about a generally horizontal axis passing through the object, and means for effecting relative vertical movement between the carrier and the surface of a treating liquid in a tank.

Where the object is a lens, it may be preferred to treat a pair simultaneously if they are to be used together. Thus, the carrier may be arranged to hold two lenses in alignment, or two carriers may be provided.

By way of exemplifying some of the broad principles outlined above, reference will now be made to some arrangements described with reference to the accompanying drawings in which.

Figure 1:
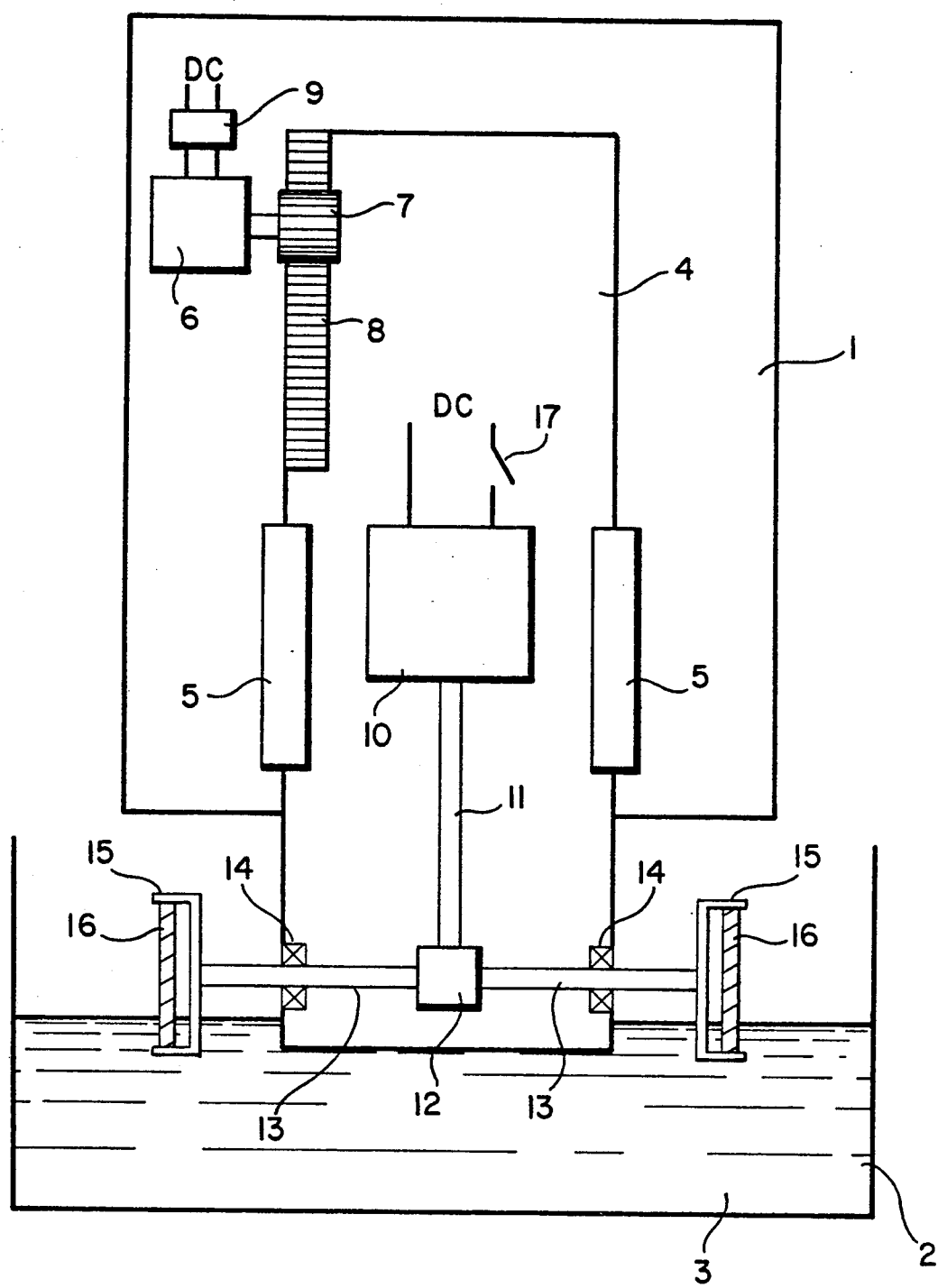
FIG. 1 is a schematic vertical elevation of suitable apparatus.

As shown in FIG. 1, the apparatus comprises a frame 1 and a tank 2 of coloured dye 3. On the frame 1 is slidably mounted a support 4 by means of guides 5, so that the support 4 can move upwards or downwards. This movement is effected by an electric motor 6 driving a pinion 7 engaging a rack 8, controlled by a changeover switch 9. On the support 4 is mounted a second electric motor 10 driving a vertical shaft 11 connected to a gearbox 12, in turn driving two horizontal shafts 13 mounted in bearings 14. At the end of each shaft 13 is a carrier 15 in which is mounted a lens 16 to be treated. Thus, on operation of a switch 17, the carrier 15 and the lenses 16 rotate about a horizontal axis. The support can then be moved gradually upwards by operating the switch 9.

Figure 2:
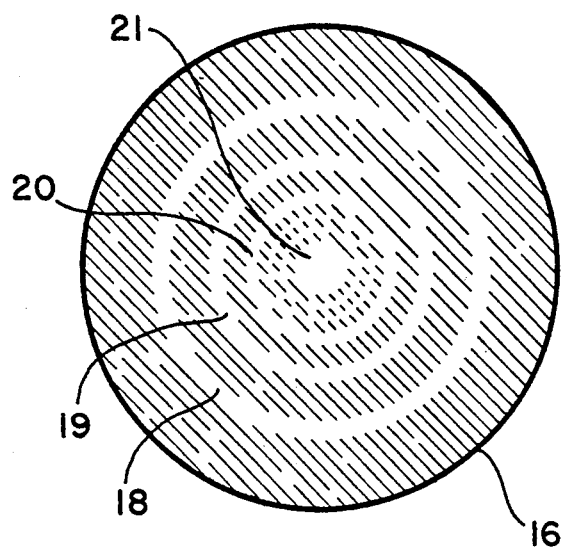
FIG. 2 is a front view of a lens made using the apparatus.

FIG. 2 shows the type of surface effect achieved on the lens 16. Thus, there is a dark peripheral region 18, lighter regions 19 and 20, and a relatively clear central zone 21.

Figure 3:
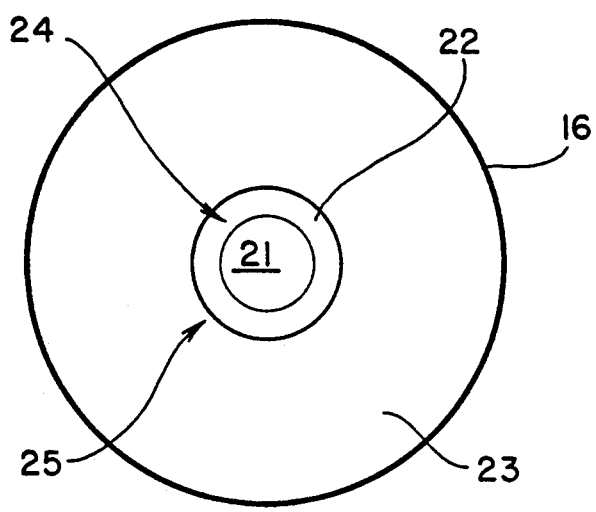
FIG. 3 shows how the lens is prepared for ultra-violet blocker to be applied to the central region of the lens.
Figure 4:
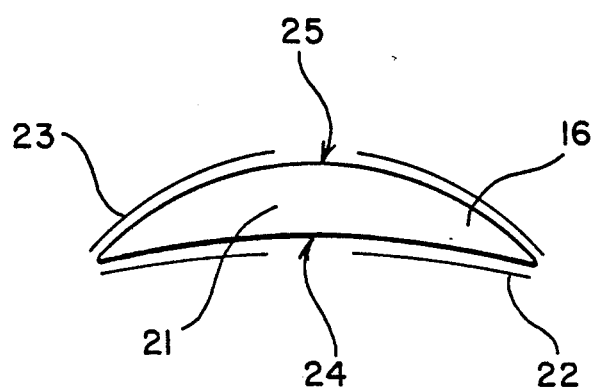
FIG. 4 is a section through FIG. 3.

With reference now to FIGS. 3 and 4, the tinted lens is provided on each side with a cover sheet 22 and 23 respectively. These have centrally disposed apertures 24 and 25, with aperture 24 being somewhat smaller than aperture 25. Typical dimensions might be diameters of 12 and 15 mm respectively. The sheets can be of a suitable adherent plastics materials or the like, for example of a type used to protect lenses during grinding. The lens is then dipped into a solution of an ultra-violet blocker such as a suitable benzophenone. Once the central region has been suitably coated, with the blocker also penetrating into the lens, the lens is rinsed off and the protective sheets removed.

The final result is a sunglass lens with a cosmetic and relaxing peripheral tint, a clear central region, to provide good forward vision, and an area of ultra-violet screening agent within this central region to protect the eye from damage. Because of the different sized apertures in the screens used in production, there is a well defined concentration gradient at the edge of the central region. Tanning can take place through the peripheral region providing that the cosmetic tinting dye does not have substantial ultra-violet screening properties and/or is not too dense.

Other desirable formats with ultra-violet screening in the central region only, might include all over colour tinting, or tinting at e.g. the top or bottom only, or no colour tinting at all. In such cases the rotating coating equipment may not be necessary.

Obviously, there may be modifications to the specific embodiments and to the broad aspects disclosed herein. Furthermore, whilst in one arrangement reference is made to rotating e.g. a lens about an axis passing through its centre it will be appreciated that this need not be the absolute geometrical or optical centre. Eccentric rotation may provide desirable effects, and in any event standard lenses which have to be treated may be cut subsequently according to the requirements of a user.

What is claimed is:

1. A pair of sunglasses having a pair of lenses of a size sufficient to cover the eyes of a user and at least a portion of the surrounding areas of the face of the user; a colored tint applied to the major part of each lens; and an ultra-violet blocking agent applied to each lens in an operative concentration sufficient to provide effective protection of the eyes from harmful ultra-violet radiation, wherein the degree of color tinting and the concentration of ultra-violet blocking agent are independent and the operative concentration of ultra-violet blocking agent is provided in a central region of each lens to protect the pupils of the eyes, and in regions surrounding said central regions of the lens ultra-violet blocking agent is provided in a concentration ranging from zero to substantially less than the operative concentration so as to permit tanning by the ultra-violet radiation of the areas of the face of the user surrounding the eyes and covered by the lens said ultra-violet blocking agent being selected from O-hydroxyphenylketones, O-hydroxybenzophenones and 2-(2-hydroxyphenyl)-benzo-triazoles.

2. A pair of sunglasses as claimed in claim 1 wherein the blocking agent is provided only in the central region of each lens.

3. A pair of sunglasses as claimed in claim 2 wherein there is a concentration gradient of blocking agent at the edge of the central region of each lens.

4. A pair of sunglasses as claimed in claim 1 wherein the blocking agent is colorless.

5. A pair of sunglasses as claimed in claim 1 wherein the colored tint has a concentration gradient in the radial direction with respect to each lens.

6. A pair of sunglasses as claimed in claim 5 wherein there is a lower concentration of colored tint in the central region of each lens.

7. A lens as claimed in claim 1 wherein the width of the central region in which the blocker is provided is in the range of 5 to 40 mm.

8. A pair of sunglasses as claimed in claim 7 wherein the width of the central region in which the blocker is provided is in the range of 10 to 15 mm.

9. A pair of sunglasses as claimed in any preceding claim wherein the central region of each lens is generally circular.

10. A pair of sunglasses having a pair of lenses of a size sufficient to cover the eyes of a user and at least a portion of the surrounding areas of the face of the user; a colored tint applied to the major part of each lens; and a colorless ultra-violet blocking agent to each lens in an operative concentration sufficient to provide effective protection of the eyes from harmful ultra-violet ration, wherein the degree of color tinting and the concentration of ultra-violet blocking agent are independent and the operative concentration of ultra-violet blocking agent is provided in a central region of each lens having a width of from 5 to 40 mm to protect the pupils of the eyes, and in regions surrounding said central regions of the lenses ultra-violet blocking agent is provided in a concentration ranging from zero to substantially less than the operative concentration so as to permit tanning by ultra-violet radiation of the areas of the face of the user surrounding the eyes and covered by the lenses said ultra-violet blocking agent being selected from O-hydroxyphenylketones, O-hydroxybenzophenones and 2-(2-hydroxyphenyl)-benzo-triazoles.

11. A pair of sunglasses as claimed in claim 10 wherein the blocking agent is provided only in the central region of each lens.

12. A pair of sunglasses as claimed in claim 11 wherein there is a concentration gradient of blocking agent at the edge of the central region of each lens.

13. A pair of sunglasses as claimed in claim 12 wherein the colored tint has a concentration gradient in the radial direction with respect to each lens.

14. A pair of sunglasses as claimed in claim 13 wherein there is a lower concentration of colored tint in the central region of the lens.

15. A pair of sunglasses as claimed in claim 10 wherein the central region of each lens is generally circular.

* * * * *